Dec. 20, 1955  S. MORTON  2,727,368
VIBRATION ABSORBING COUPLING
Filed Dec. 8, 1950
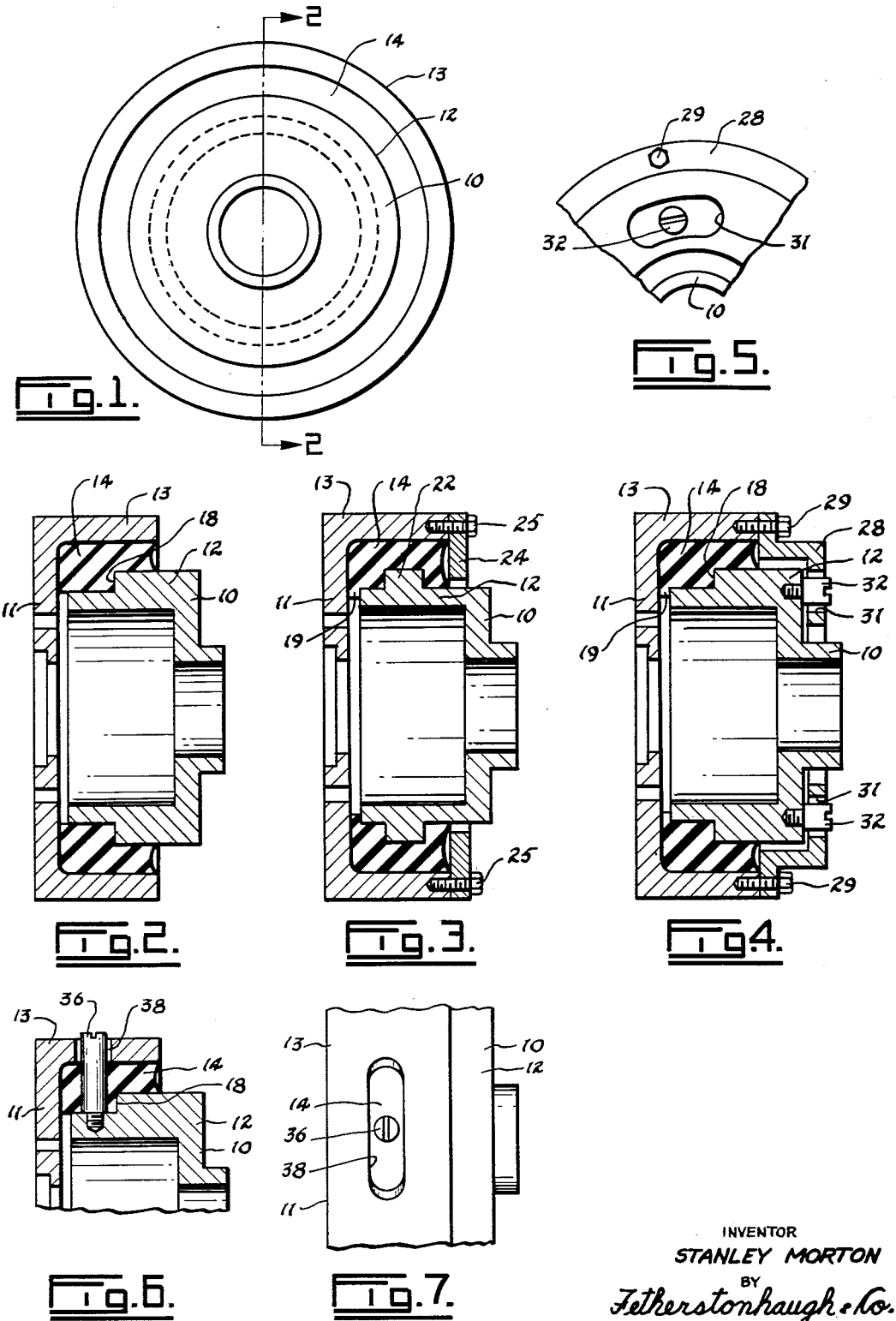
INVENTOR
STANLEY MORTON
BY
Fetherstonhaugh & Co.
ATTORNEYS

United States Patent Office 2,727,368
Patented Dec. 20, 1955

2,727,368

VIBRATION ABSORBING COUPLING

Stanley Morton, Vancouver, British Columbia, Canada

Application December 8, 1950, Serial No. 199,818

2 Claims. (Cl. 64—11)

This invention relates to vibration absorbing couplings.

An object of the present invention is the provision of a very simple vibration absorbing coupling for connecting two elements, such as a propeller shaft to the power shaft of an engine.

Another object is the provision of a simple coupling particularly for connecting propeller shafts to engine shafts which is effective regardless of which way the shafts are rotated.

Yet another object is the provision of a vibration absorbing coupling for connecting driving and driven shafts which will give should the driven shaft be accidentally stopped while the other shaft continues to rotate.

A still further object is the provision of a coupling which is normally adapted to absorb vibration and which will continue to function even should the vibration absorbing means become ineffective.

This coupling may be in the form of an insert to fit between the existing companion flanges on the shafts to be connected, or may be in the form of a pair of companion flanges. In either case, the coupling consists of two spaced-apart plates adapted to be connected to the elements to be coupled, a flange around the edge of each plate extending towards the other plate, one flange being within and spaced from the other, and a resilient connector filling the space between and bonded to the flanges. If desired, a cover may be secured to the edge of the outer flange in a position to overlap the resilient connector.

Examples of this invention are illustrated in the accompanying drawings, in which:

Figure 1 is an elevation of one form of coupling,

Figure 2 is a section taken on the line 2—2 of Figure 1,

Figure 3 is a section similar to Figure 2 through another form of coupling,

Figure 4 is a similar section through still another form of coupling,

Figure 5 is a fragmentary detail of the alternative illustrated in Figure 4,

Figure 6 is a fragmentary sectional view of a coupling which is different from the other couplings, and Figure 7 is a fragmentary plan view of the coupling of Figure 6.

Referring to Figures 1 and 2, 10 and 11 are spaced-apart plates having flanges 12 and 13 respectively, extending around their edges. Each flange extends towards the opposite plate, while the flange 12 is within and spaced from the flange 13. A connector 14 formed of any suitable resilient material, such as rubber or rubber composition, fills the space between the inner and outer flanges and is bonded thereto in any convenient manner.

The plates 10 and 11 may be adapted to be secured to the companion flanges of the shafts to be connected, or they may actually be the companion flanges. The connector 14 forms a resilient driving connection between the flanges of these plates. Vibrations created by either of the shafts will be absorbed by the connector instead of being transmitted to the other shaft.

A shoulder 18 may extend around the outer surface of the inner flange 12 spaced from the opposite plate, said shoulder being at least one third of the width of the flange. This shoulder is covered by the resilient connector. Thus, the connector lies between the adjacent surfaces of the flanges, and between the inner surface of the plate 11 and the shoulder 18. This will reinforce the connector and form a better driving connection between the respective plates and their flanges. Since this arrangement gives two different thicknesses of the resilient composition, each thickness has its own period of torsional or angular vibration. As a consequence, the two vibration periods tend to dampen each other, thus eliminating any natural tendency of the unit to vibrate in an angular manner.

Figure 3 shows a shoulder 22 in the form of a rib extending around the outer surface of the inner flange 12 spaced from the opposite edges of the latter, said shoulder being at least one third of the width of the flange. This rib or shoulder projects into the resilient connector 14 and helps to retain the flange 12 in its proper position spaced from the plate 11. If desired, the connector may be formed with an extension 19 lying between the inner edge of the inside flange 12 and the plate 11. This extension acts as a washer and helps to take the thrust between the flange edge and the adjacent plate. Here again, the thickness of the connector is less at the rib than at any other part, thus providing different periods of vibration.

If desired, a cover 24 may be secured to the edge of the outer flange 13 in any suitable manner, such as by means of studs 25 extending through said cover and threaded into the flange edge. This cover overlaps the connector 14, and it may be bonded to the connector, although this not absolutely necessary.

This coupling is particularly adapted for connecting a propeller shaft to the power shaft of an engine in boats. This means that when the propeller is being rotated in one direction, the thrust is from one plate through the resilient connector to the other plate. However, when the propeller is turned in the opposite direction, there is a pull from one plate through the connector to the other. In a great many cases and particularly in small boats, the connector will withstand the pull. However, to be sure and particularly in large boats, the cover 24 may be employed to confine the connector in such a way that it will readily stand both the thrust and the pull.

Figure 4 illustrates an alternative cover arrangement in connection with the form of the invention shown in Figure 2, but it is to be understood that this cover arrangement may also be used in the form of the invention shown in Figure 3. In this form of the invention, a cover 28 is connected to the edge of the outer flange 13 by means of studs 29. This cover is shaped to overlap the connector 14 and the plate 10, but it is spaced from these, as clearly shown in the drawings. This cover will function in the same manner as the cover 24. However, it is preferable to form the cover 28 with a plurality of spaced elongated openings 31 in the portion thereof overlapping the plate 10. A pin projects outwardly from said plate through each of these openings, and each pin may be in the form of a stud 32 threaded into the plate. These pins or studs are normally spaced from the edges of their respective openings.

When the coupling illustrated in Figure 4 is operating normally, the pins 32 do not contact the cover 28 and are not serving any purpose. However, should the resilient connector 14 shear or separate from either of the flanges 12 or 13, the coupling will not be put out of action. In this event, the pins 32 would engage the ends of the openings 31, thus acting along with the cover 20 as connecting means between the two plates. In other words, these come into operation only in an emergency. The clearance between the cover 28 and the plate 10 is very little so that, in a marine installation, when the propeller is moving astern, the plate may engage the cover to relieve the connector 14 of any undue strain.

Figures 6 and 7 illustrate a coupling which will function in the same manner as that of Fig. 4 should the resilient connector 14 shear or separate from either of the flanges 12 or 13. This coupling has the shoulder 18 of Fig. 4, but it is to be understood that it may be formed with the shoulder 22 of Fig. 3 instead thereof. A plurality of pins or studs 36 are secured into the inner flange 12 of the plate 10 and project outwardly therefrom. Figs. 6 and 7 show only one of these pins or studs. Each pin or stud extends through the connector 14 into an elongated slot 38 formed in the outer flange 13 of the plate 11. Each stud is located centrally in its slot and normally does not touch either side thereof, as clearly seen in Fig. 7. The pins or studs 36 do not normally do anything. However, should the connector 14 shear or become separated from either of the inner or outer flanges 12 or 13, these pins or studs move to the ends of their slots to form a driving connection between the flanges. Thus, the coupling cannot become inoperative as a result of a failure of the resilient connector.

The embodiments of the invention in which an exclusive property or privilege is claimed are defined as follows:

1. A vibration absorbing coupling comprising two spaced-apart plates adapted to be connected to the elements to be coupled, a flange around the edge of each plate extending axially towards the other plate and spaced from the latter, one flange being within and spaced from the other, a rib extending around the surface of one flange and extending radially towards and spaced from the opposite flange, said rib being spaced from the opposite edges of its flange, and an annular resilient connector extending between and bonded to the flanges and overlying the rib, the length of said rib in an axial direction being equal to at least one-third of the axial length of the portion of the connector bonded to one of the flanges, and the portion of the connector between the rib and the opposite flange being thinner than the rest of the connector to provide different periods of angular vibration.

2. A vibration absorbing coupling comprising two spaced-apart plates adapted to be connected to the elements to be coupled, a flange around the edge of each plate extending axially towards the other plate and spaced from the latter, one flange being within and spaced from the other, a rib extending around the outer surface of the inner flange spaced inwardly from the opposite edges of the latter, an annular resilient connector extending between and bonded to the flanges and overlying the rib, the length of said rib in an axial direction being equal to at least one-third of the axial length of the portion of the connector bonded to one of the flanges, and a cover secured to the edge of the outer flange and overlapping the connector.

References Cited in the file of this patent

UNITED STATES PATENTS

| | | |
|---|---|---|
| 988,119 | Livingston et al. | Mar. 28, 1911 |
| 1,931,027 | Lee | Oct. 17, 1933 |
| 2,041,507 | Zeder | May 19, 1936 |
| 2,138,176 | Keys | Nov. 29, 1938 |
| 2,154,077 | Sampson | Apr. 11, 1939 |
| 2,295,282 | Mall | Sept. 8, 1942 |
| 2,367,833 | Riesing | Jan. 23, 1945 |

FOREIGN PATENTS

| | | |
|---|---|---|
| 706,612 | Germany | May 30, 1941 |